US011245880B2

(12) United States Patent
Jeromin

(10) Patent No.: US 11,245,880 B2
(45) Date of Patent: Feb. 8, 2022

(54) TECHNIQUES FOR SPATIAL DATA PROJECTION

(71) Applicant: Universal City Studios LLC, Universal City, CA (US)

(72) Inventor: Aaron Chandler Jeromin, Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 64 days.

(21) Appl. No.: 16/717,843

(22) Filed: Dec. 17, 2019

(65) Prior Publication Data

US 2021/0084264 A1 Mar. 18, 2021

Related U.S. Application Data

(60) Provisional application No. 62/899,562, filed on Sep. 12, 2019.

(51) Int. Cl.
*H04N 9/31* (2006.01)
*H04N 5/44* (2011.01)

(52) U.S. Cl.
CPC ............ *H04N 9/3108* (2013.01); *H04N 5/44* (2013.01); *H04N 9/3147* (2013.01); *H04N 9/3155* (2013.01)

(58) Field of Classification Search
CPC .. H04N 9/3108; H04N 9/3147; H04N 9/3155; H04N 9/315; H04N 9/31; H04N 5/44
USPC ................ 348/759; 345/633; 356/4; 463/30; 434/16
See application file for complete search history.

(56) References Cited

U.S. PATENT DOCUMENTS

| 9,511,291 | B2* | 12/2016 | Lyons | G07F 17/3211 |
|---|---|---|---|---|
| 9,677,840 | B2* | 6/2017 | Rublowsky | F41A 33/00 |
| 2009/0096994 | A1* | 4/2009 | Smits | G01B 11/14 353/30 |
| 2013/0278631 | A1* | 10/2013 | Border | G02C 5/143 345/633 |
| 2015/0235456 | A1* | 8/2015 | Schowengerdt | G02B 27/017 345/633 |
| 2015/0260474 | A1* | 9/2015 | Rublowsky | A63F 13/213 434/16 |
| 2016/0346704 | A1 | 12/2016 | Wagner | |

(Continued)

OTHER PUBLICATIONS

PCT/US2020/049684 International Search Report and Written Opinion dated Nov. 19, 2020.

*Primary Examiner* — John W Miller
*Assistant Examiner* — Sean N. Haiem
(74) *Attorney, Agent, or Firm* — Fletcher Yoder, P.C.

(57) ABSTRACT

A system including a projection device configured to emit a plurality of light beams, where each individual light beam is emitted with a unique path within an environment, and where each individual light beam has a modulation pattern configured to transmit data corresponding to the unique path. The system also includes a receiver device having a sensor configured to detect at least one individual light beam of the plurality of light beams, a receiver processor configured to identify the modulation pattern of the detected individual light beam and generate response instructions based on the position data transmitted via the modulation pattern, and an output device configured to output a response based on the generated response instructions.

19 Claims, 6 Drawing Sheets

(56) References Cited

U.S. PATENT DOCUMENTS

| | | |
|---|---|---|
| 2017/0169449 A1 | 6/2017 | Heaven et al. |
| 2017/0206417 A1* | 7/2017 | Aoyama .................. G09G 5/00 |
| 2018/0104600 A1 | 4/2018 | Stenzler |
| 2018/0136646 A1* | 5/2018 | Gurdan ................... G09F 21/06 |
| 2018/0142483 A1 | 5/2018 | Gutierrez et al. |
| 2019/0054379 A1* | 2/2019 | Ackley .................... G02B 5/30 |
| 2019/0101638 A1* | 4/2019 | Vu .......................... G01S 13/89 |
| 2019/0187482 A1* | 6/2019 | Lanman .................. G06F 3/011 |
| 2019/0268072 A1* | 8/2019 | Aoyama ............ H04B 10/1141 |
| 2019/0384414 A1* | 12/2019 | Woo ........................ G06F 3/147 |
| 2020/0103527 A1* | 4/2020 | Chen ..................... G01S 1/7038 |

* cited by examiner

TECHNIQUES FOR SPATIAL DATA PROJECTION

The present application claims the benefit of U.S. Provisional Application No. 62/899,562, entitled "TECHNIQUES FOR SPATIAL DATA PROJECTION" and filed Sep. 12, 2019, the disclosure of which is incorporated herein by reference for all purposes.

BACKGROUND

The present disclosure relates generally to the field of amusement parks. Specifically, embodiments of the present disclosure are related to techniques for spatial data projection, e.g., using digital light processing.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Theme park or amusement park attractions have become increasingly popular, and various amusement park attractions have been created to provide guests with unique immersive experiences. Certain amusement park attractions allow guests to move around freely while using virtual reality or augmented reality devices to help provide the guests with the unique immersive experiences. As the guests move through the attraction, it may be desirable to update images viewed by the guest (e.g., video feed, pictures, or text or images based instructions) based on a position of the guest in the amusement park attraction. Traditionally, tracking a location of a guest and updating the display involves a head mounted display with onboard cameras or external calibrated tracking systems. However, these head mounted displays are generally expensive, power hungry, and heavy, which may detract from the immersive experience. Accordingly, it is now recognizable that it is desirable to improve these amusement park attractions.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes a projection device configured to emit a plurality of light beams. Each individual light beam is emitted with a unique path within an environment. Further, each individual light beam has a modulation pattern configured to transmit data corresponding to the unique path. The system also includes a receiver device having a sensor configured to detect at least one individual light beam of the plurality of light beams, a receiver processor configured to identify the modulation pattern of the detected individual light beam and generate response instructions based on the position data transmitted via the modulation pattern, and an output device configured to output a response based on the generated response instructions In accordance with an embodiment, a system includes a system controller configured to generate a plurality of image data instruction sets. Each image data instruction set corresponds to a respective area. The system also includes a projection device configured to emit a plurality of light beams simultaneously. An individual light beam of the plurality of light beams includes a modulation pattern configured to transmit image data based on the image data instruction set corresponding to the area through which the individual light beam is configured to pass. The system further includes a receiver device having a sensor configured to detect the individual light beam of the plurality of light beams, a processor configured to determine the image data based on the modulation pattern of the detected individual light beam, and a display device configured to display an image based on the image data.

In accordance with an embodiment, a method includes the step of emitting a plurality of light beams via a projection device. Each individual light beam of the plurality of light beams has a unique modulation pattern configured to transmit data corresponding to a respective area. The method further includes the step of detecting an individual light beam of the plurality of light beams via a receiver device. The method also includes the step of generating response instructions based on data received by a receiver device via the unique modulation pattern of the detected light beam. Additionally, the method includes the step of outputting a response based on the response instructions via an output device.

In accordance with an embodiment, a system includes a projection device configured to emit a plurality of light beams. Each individual light beam is emitted with a unique path within an environment. Further, each individual light beam has a modulation pattern configured to transmit position data corresponding to the unique path. The system also includes a receiver device having a sensor configured to detect at least one individual light beam of the plurality of light beams to generate sensor data indicative of the modulation pattern and communications circuitry configured to transmit the sensor data. The system further includes a system controller configured to receive the sensor data and determine a position of the receiver device within the environment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
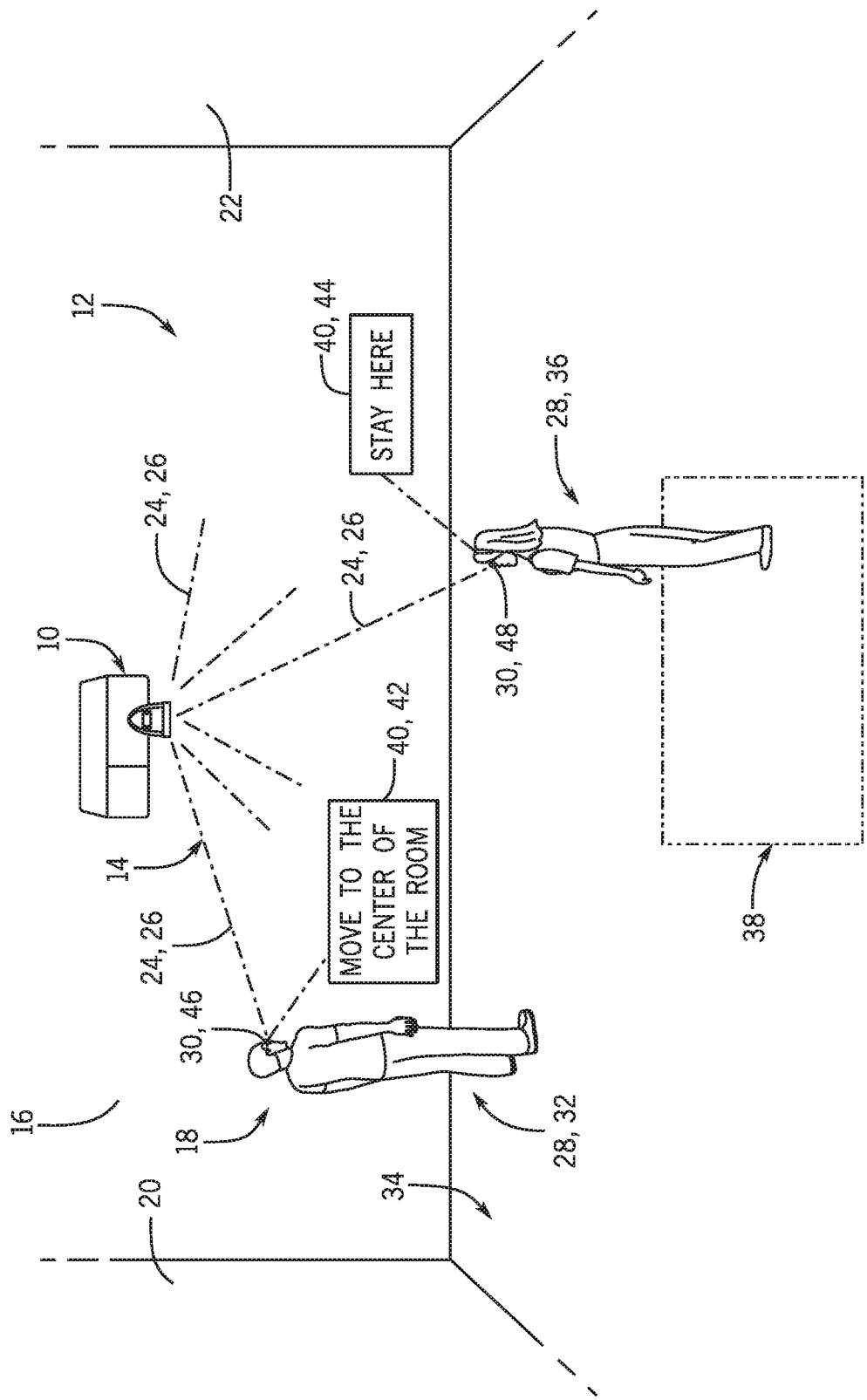
FIG. 1 is a perspective view of an embodiment of a spatial data projection system for an amusement park attraction, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Provided herein is a system and method that permit position tracking and/or communication using projected light, e.g., light projected using digital light processing (DLP) techniques. The present techniques may facilitate self-locating of objects within the field of projected light. That is, the light may be projected such that objects positioned within the field of projected light detect light beams that carry position information. In an embodiment, one or more receiver devices detect projected light that carries information specific to the unique path of the light using on-board light sensors. The receiver device (e.g., augmented display glasses, toy, wand, or drone) may receive location-specific images or instructions, or may trigger location specific special effects in the amusement park attraction without active tracking of a location of the receiver device. The projected light delivers pixel data along specific light paths, with different light paths being capable of delivering different pixel data. In an embodiment, the disclosed techniques permit delivery of location-specific data without using active communication or position information generated by the guest device or without using an external camera-based tracking system. As such, the system and method do not require a traditional head mounted display with onboard cameras or external calibrated tracking systems. Instead, the system and method may include one or more projection devices (e.g., projector/s) that emit a plurality of light beams within an area of an amusement park attraction, where each light beam of the plurality of light beams has a unique path and a unique modulation pattern indicative of the unique path. As a guest wearing the receiver device moves throughout the attraction, the receiver device may intercept and detect individual light beams of the plurality of light beams. The receiver device may be configured to determine or identify a position of the receiver device within the attraction based at least in part on the unique modulation patterns associated with the detected light beams.

Specifically, the receiver device may include an optical sensor configured to detect an individual light beam when the sensor is positioned in the unique path of the individual light beam. As provided herein, individual light beams may have respective unique modulation patterns that are indicative of the unique path of the individual light beam. A processor of the receiver device is configured to identify the unique modulation pattern based on data generated from the on-board sensor upon detection of the individual light beam. As provided herein, the unique modulation pattern may be a modulation pattern that is distinguishable from other modulation patterns emitted in other light beams that are simultaneously emitted from the projection device. The modulation pattern may be configured to transmit position data corresponding to a respective area of the amusement park attraction along the unique path, such that the processor may determine the position of the receiver device based at least in part on the identified modulation pattern. The processor may generate response instructions based on the identified modulation pattern. Further, an output device of the receiver device may output location specific images or instructions to a display of the receiver device, or to trigger location specific special effects based on the response instructions.

In this manner, a system that includes guest receiver devices or other receiver devices that are positioned within an amusement park attraction may passively detect projected light and, based on the detected light, determine location or position information, which in turn may trigger additional actions by the receiver device and/or by the system. This is in contrast to position detection techniques that involve active communication from the device of interest to determine position or that involve image-based tracking of the devices themselves. The detected light may include information from which position may be determined and, in certain embodiments, may include position-specific data or instructions. Further, the disclosed techniques may be implemented using relatively inexpensive components for receiver devices, such as an optical sensor and limited or no processor/memory capability. This provides the benefit of removing more costly hardware elements from devices that may be handed out to guests or provided as part of a toy.

FIG. 1 is a perspective view of an embodiment of a spatial data projection system having a projection device 10 disposed in an amusement park attraction 12. The projection device 10 is configured to emit a plurality of light beams 14. Each light beam of the plurality of light beams 14 is emitted along a unique path 24 toward various portions of the amusement park attraction 12. For example, the projection device 10 may be disposed on a front wall 16 of an environment 18 in the amusement park attraction 12 and oriented to emit the plurality of light beams 14 into the environment 18. In some embodiments, the projection device is disposed on a ceiling of the environment. The plurality of light beams 14 may be emitted such that individual light beams 26 span a width of the environment 18 (i.e., from a left wall 20 of the environment to a right wall 22 of the environment). Further, the plurality of light beams 14 may be emitted such that respective unique paths 24 of at least some of the plurality of light beams 14 may travel from the projection device 10 to a back wall of the environment 18 in the amusement park attraction 12. In some embodiments, the plurality of light beams 14 may be emitted such that individual light beams 26 span a height of the environment 18. In some embodiments, at least some of the individual light beam 26 of the plurality of light beams 14 are emitted with distinguishable or unique modulation patterns. The modulation pattern may be configured to transmit position data corresponding to a respective area of the amusement park attraction 12 along the unique path of the respective individual light beams 26. In an embodiment, the projection device 10 projects in nonvisible or visible frequencies. For example, using nonvisible frequencies may be less intrusive and, therefore, may contribute to the immersive nature of the attraction 12.

A guest 28 of the amusement park attraction 12 may have a receiver device 30. The receiver device 30 (e.g., augmented display glasses, wand, or drone) includes a sensor configured to detect the individual light beam 26 intercepted by the sensor when the sensor is positioned in the unique path 24 of the individual light beam 26. A processor of the receiver device 30 is configured to identify the unique modulation pattern of the detected individual light beam 26. Based on the identified unique modulation pattern, the processor, or a device in wireless communication with the processor 30, may associate the identified unique modulation pattern of the receiver device 30 with particular position-associated data. For example, the processor may access a look-up table or may process the identified unique modulation pattern to associate the receiver device 30 with a pre-determined position within the room 18. Because an individual light beam 26 may be associated with multiple potential positions along the unique path 24, the determination may also involve an intensity component, such that higher intensities are associated with positions closer to the projection device 10 and/or a phase component. Further, the received light from other projection devices 10 at different positions may be used to triangulate position within the room 18.

The processor may generate response instructions based on the position data transmitted via the unique modulation pattern, and an output device of the receiver device 30 may be configured to output a response 40 (e.g., display location specific images or instruction, or trigger location specific special effects) based on the generated response instructions. For example, a first guest 32 may be standing close to a corner 34 of an environment of the amusement park attraction 12 and a second guest 36 may be standing close to a center 38 of the environment 18 of the amusement park attraction 12. During an event of the amusement park attraction 12, each of the guests 28 may be required to move to the center 38 of the environment 18. As the first guest 32 is standing close to the corner 34 of the environment 18, a first receiver device 46 corresponding to the first guest may output first instructions 42 to the first guest 32, via the first receiver device, to move to the center 38 of the environment 18. As the second guest 36 is already positioned in the center 38 of the environment 18, a second receiver device 48 corresponding to the second guest 36 may output second instructions 44 to the second guest 36, via the second receiver device, to stay in the center 38 of the environment 18. In another example, the receiver device 30 may be a wand configured to glow different colors based on a position of the guest 28 in the environment 18. As the guest 28 moves from the corner 34 of the environment 18 toward the center 38 of the environment, the wand may change colors from red to green.

Each receiver device 30 may include a display device having a screen. The outputs or responses may include images configured to be displayed on the screen of the display device via the output device. For example, the receiver device 30 may be a pair of augmented reality glasses (AR glasses) configured to worn by the guest of the amusement park attraction. The display device may include the lenses of the AR glasses, and the output device may include an AR projection device configured to project the response 40 (e.g., images or instructions) onto the lenses such that the responses 40 are viewable for the guest 28 wearing the AR glasses. The response 40 may include a textual image (e.g., text based message to move to the center of the environment). However, the response 40 may also include a picture image, a video image, or some combination thereof. For example, some guests 28 (e.g., children, foreign guests, etc.) may not understand text-based messages. Thus, the response 40 may include a picture image (e.g., an arrow configured to point toward a target destination to lead the guests to the center of the environment).

As the guest 28 moves throughout the amusement park attraction 12, the receiver device 30 may update the response 40 based on a position of the guest 28 in the amusement park attraction 12. Specifically, as the receiver device 30 moves through the amusement park attraction 12, the sensor may detect different individual light beams intercepted by the sensor. Each of the different individual light beams detected by the sensor may have unique modulation patterns. As the receiver device 30 is configured to generate the response 40 based on the detected unique modulation pattern, the receiver device 30 may update the response 40 (e.g., image) based on the changing unique modulation patterns detected by the sensor as the receiver device moves through the amusement park attraction 12. The receiver device 30 may be configured to output any number of responses 40 based on the position of the receiver device 30 corresponding to the guest 28 in the amusement park attraction 12.

In an embodiment, the receiver device 30 is used in conjunction with an aerial drone. The aerial drone may be configured to follow a flight path around the amusement park attraction 12. The aerial drone may have a sensor configured to detect the plurality of light beams 14. Based on the unique modulation patterns, transmitted via the plurality of light beams 14, the aerial drone may be configured to activate or release a special effect. For example, the aerial drone may be configured to glow red in response to a first unique modulation pattern and release confetti in response to a second modulation pattern. In an embodiment, the receiver device 30 may be incorporated into a moving set piece.

Figure 2:
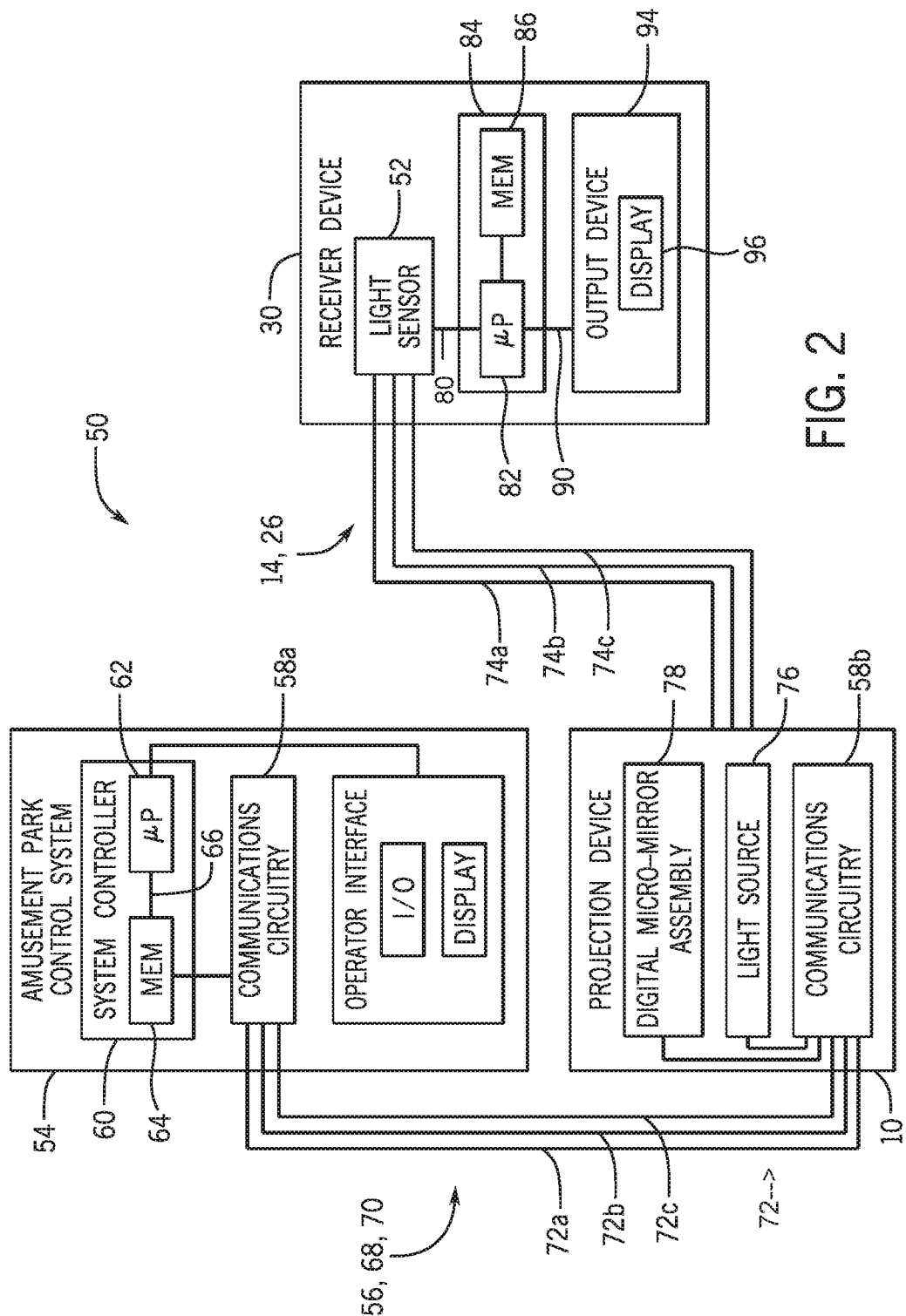
FIG. 2 is a block diagram of an embodiment of the spatial data projection system, in accordance with an aspect of the present disclosure.

FIG. 2 is a block diagram of an embodiment of a spatial data projection system 50. The receiver device 30 of the spatial data projection system 50 is configured to generate the response 40 based on the unique modulation pattern emitted by the projection device 10 and detected by a sensor 52 (e.g., light sensor) of the receiver device 30. An amusement park control system 54 is configured to communicate instructions 56 to the projection device 10 via communications circuitry 58a, 58b. The communications circuitry 58a, 58b may include antennas, radio transceiver circuits, and signal processing hardware and/or software (e.g., hardware or software filters, A/D converters, multiplexers amplifiers), or a combination thereof, and may be configured to communicate over wireless communication paths via Infrared (IR) wireless communication, satellite communication, broadcast radio, Microwave radio, Bluetooth, Zigbee, Wifi, UHF, NFC, etc.

The amusement park control system 54 may have a system controller 60 that includes a processor 62 and a memory 64. The processor 62 may include one or more processing devices, and the memory 64 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 62 or by other processor-based devices (e.g., mobile devices). In some embodiments, the memory 64 is configured to store system controller instructions 66 executable by the processor 62 to output various control system signals (e.g., instructions 56). For example, the processor 62 may execute the system controller instructions 66 to output a control system signal(s) 68 with instructions 56 to activate the projection device 10. In some embodiments, the instructions 56 are configured to control the modulation patterns output via the plurality of light beams 14 emitted from the projection device 10.

In some embodiments, the system controller 60 is configured to generate a plurality of image data instruction sets 70. The plurality of image data instruction sets 70 may be communicated via the control signal 58 and are configured to cause the projection device 10 to emit particular unique modulation patterns. The system controller 60 may be configured to generate an image data instruction set 72 for each respective area of the amusement park attraction. For example, the amusement park attraction may be divided into three areas. The system controller 60 may generate an image data instruction set 72a, 72b, and 72c for each of the three areas. A first image data instruction set 72a may be communicated to the projection device 10 via the communication circuitry 58a, 58b such that the projection device 10 emits a first group of light beams 74a with each light beam of the first group of light beams 74a having a first unique modulation pattern. Similarly the system controller 60 may generate a second image data instruction set 72b and third image data instruction set 72c each configured to be communicate to the projection device 10 such that the projection device 10 emits a second group of light beams 74b and third group of light beams 74c having respective second and third unique modulation patterns. The first unique modulation pattern may cause the receiver device 30 (e.g., AR glasses, wand, aerial drone) to glow with a blue light. The second and third modulation patterns may cause the receiver device 30 to glow with green and red light respectively. Thus, the receiver device 30 corresponding to the guest may change from glowing blue to green to red as the guest moves with the receiver device 30 through the three areas of the amusement park attraction corresponding to the first, second, and third image data instruction sets 72a, 72b, 72c.

As set forth above the projection device 10 is configured to receive the control system signal 68 from the system controller 60 via the communication circuitry 58a, 58b. The projection device 10 has the communication circuitry 58b configured to receive the control system signal 68. Further, the projection device 10 includes a light source 76 configured to generate the plurality of light beams 14. In some embodiments, the light source 76 is an infrared light source configured to emit a plurality of infrared light beams. In some embodiments, the plurality of light beams 14 may be visible light beams, ultraviolet light beams, or some combination thereof. The light source 76 may include a plurality of diodes configured to emit individual light beams based at least in part on the control system signal(s) 68.

Further, the projection device may include a digital micro mirror system 78. The digital micro mirror system 78 may be configured to actuate based at least in part on the control system signal(s) 68 from the system controller 60. The digital micro mirror system 78 may include a plurality of mirrors configured to actuate between different orientations and to reflect the plurality of light beams 14 emitted from the light source 76. The plurality of mirrors may be configured to selectively reflect the plurality of light beams 14 to generate the unique modulation patterns for each light beam of the plurality of light beams 14 based at least in part on the control system signal(s) 68. The plurality of mirrors may selectively reflect the plurality of light beams 14 such that the unique modulation pattern transmits a binary code.

The receiver device 30 is configured to detect the individual light beams 26 of the plurality of light beams 14 emitted from the projection device 10. Specifically, the sensor 52 is configured to detect the individual light beam or beams 26 of the plurality of light beams 14 when the sensor 52 is disposed in or along the unique path corresponding to the individual light beam 26. The sensor 52 may be configured to output data 80 associated with the detected individual light beam 26 to a receiver processor 82 of the receiver device 30. In some embodiments, the unique modulation pattern is configured to transmit a binary code. Detection of the individual light beam 26 may indicate a binary 1, and gaps in detection of the individual light beam 26 (e.g., the sensor 52 not detecting the individual light beam 26) may indicate a binary "0". However, any suitable code or method of communication may be employed to transmit the unique modulation pattern via the individual light beams 26.

The receiver device may include a receiver controller 84 having the receiver processor 82 and a receiver memory device 86 configured to receive the data 80 associated with the detected individual light beam 26 and identify the unique modulation pattern emitted via the individual light beam 26. The receiver memory device 86 may store a plurality of responses corresponding to potential modulation patterns emitted from the projection device 10. The receiver processor 82 may be configured to generate response instructions 90 based on the identified modulation pattern from the detected individual light beam 26 and the plurality of responses stored on the receiver memory device 86.

In some embodiments, the projection device 10 is configured to emit the plurality of light beams 14 at varying frequencies. The receiver memory device 86 may have a set of decoding instructions for the receiver processor 82. The set of decoding instructions may correspond to detected individual light beams 26 within a predetermined range of frequencies (e.g., 300 GHz to 3000 GHz), wherein the at least one set of decoding instructions is configured to cause the receiver processor 82 to decode the unique modulation pattern of the detected individual light beams 26 within the range of frequencies and generate the response instructions 90 based on the decoded unique modulation pattern. In some embodiments, the decoding instructions may vary by receiver device 30. For example, the amusement park attraction may have a first receiver device 30 for adults and a second receiver device 30 for children. The first receiver device 30 may have a first set of decoding instructions stored in a first receiver memory device 30, and the second receiver device 30 may have a second set of decoding instructions stored in a second receiver memory device of the second receiver device 30. Further, the projection device 10 may be configured to output a first unique modulation pattern, via a first individual light beam having a frequency within a first frequency range, to a first area of the amusement park attraction. The projection device 10 may also be configured to output a second unique modulation pattern, via a second individual light beam having a frequency within a second frequency range, to a second area of the amusement park attraction. The first unique modulation pattern may be configured to cause the first receiver device (e.g., receiver device for adults) to stop glowing, and the second unique modulation pattern may cause the second receiver device (e.g., receiver device for children) to start glowing in the first area of the amusement park attraction. Thus, the receiver device 30 may be configured to output responses based on the decoding instructions stored on the receiver memory device 86.

Moreover, the receiver processor 82 is configured to output the response instructions 90 to an output device 94 of the receiver device 30. The output device 94 is configured to output a response based on the generated response instructions 90. The responses may include displaying an image or instructions via a display device 96, triggering a special effect, or any other suitable response. In some embodiments, the receiver device 30 includes the display device 96 (e.g., AR glasses). The generated response instructions 90 may be configured to cause the display device 96 to display an image for the guest 28 corresponding to the receiver device 30. As set forth above, the displayed image may be based on the position of the receiver device 30 in the amusement park attraction. Further, the displayed image may be based on the decoding instructions stored in the receiver memory device 86 of the receiver device 30.

It should be understood that, in an embodiment, the receiver device 30 may be implemented without one or more of the processor 82, memory 84, and/or the output device 94. That is, in one configuration, the receiver device 30 may include the sensor 52 and communication circuitry to pass along the detected light data from the sensor 52, along with device identification information, to the control system 54. The control system 54 may perform the association of receiver device 30 with the detected light data with the position information and/or other instructions.

Figure 3:
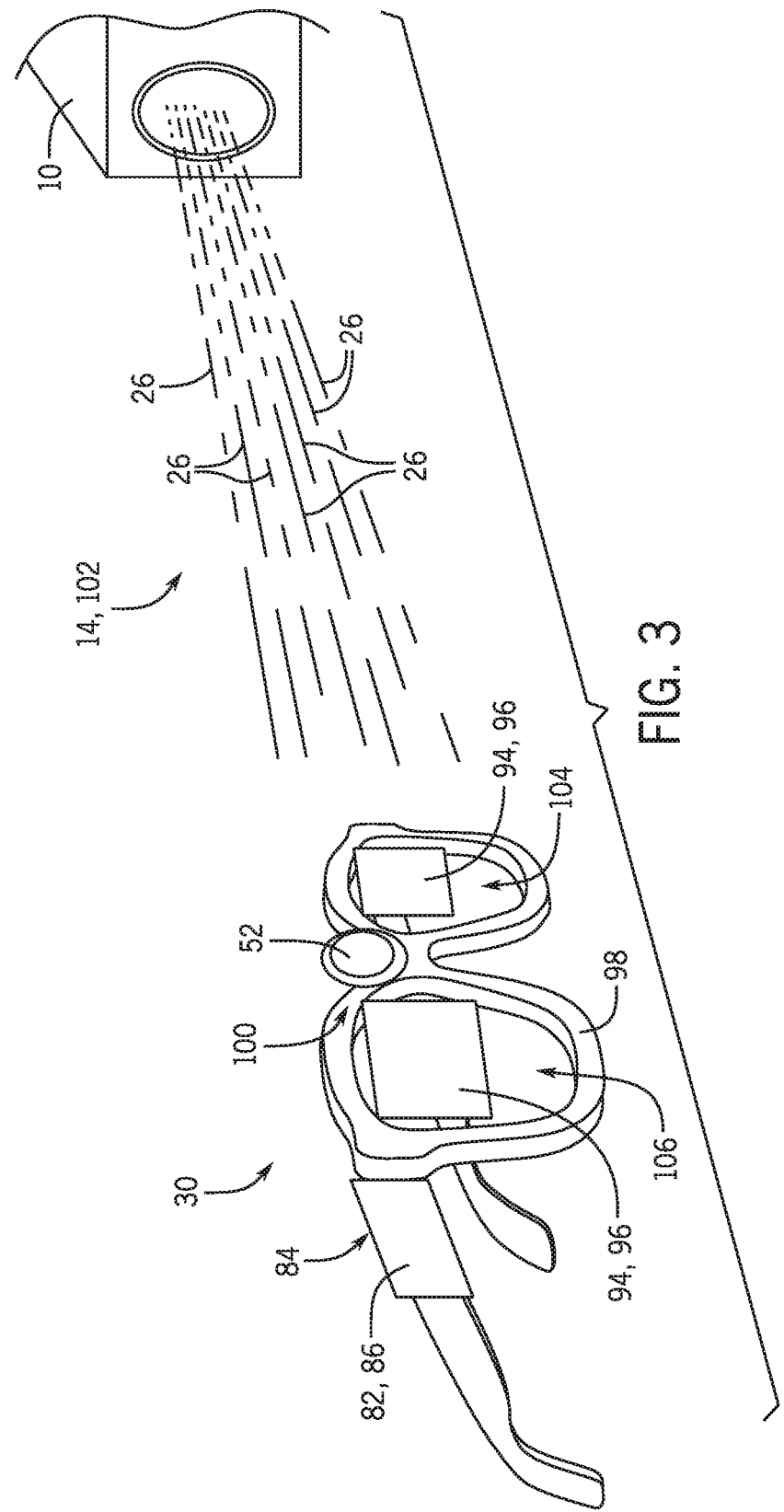
FIG. 3 is a perspective view of an embodiment of a receiver device, in accordance with an aspect of the present disclosure.

FIG. 3 is a perspective view of an embodiment of the receiver device 30. The receiver device 30 may be augmented reality display glasses (AR glasses), a wand, a drone, or some other suitable device configured to detect the individual light beams 26 emitted from the projection device 10. In the illustrated embodiment, the receiver device 30 is a pair of AR glasses. The receiver device 30 includes the sensor 52 configured to detect the individual light beams 26 of the plurality of light beams 14. The sensor 52 may be coupled to a frame 98 of the AR glasses. Further, the sensor 52 may be coupled to a front portion 100 of the frame 98 of the AR glasses. The sensor 52 may be an infrared light sensor, a visible light sensor, or an ultraviolet light sensor. A type of the sensor 52 (e.g., infrared, ultraviolet, visible) is configured to correspond to a type of light of the individual light beam/s 26 emitted via the projection device 10.

The receiver device 30 includes the receiver controller 84 having the receiver processor 82 and the receiver memory device 86. The receiver controller 84 may be coupled to the frame 98 of the AR glasses. As set forth above, the receiver processor 82 is configured to identify the unique modulation pattern 102 of the detected individual light beam 26 and generate the response instructions based on the identified unique modulation pattern 102. Further, the receiver processor 82 is configured to output the response instructions to the output device 94.

The output device 94 is configured to output the response (e.g., display location specific images or instruction, or trigger location specific special effects) based on the generated response instructions. In the illustrated embodiment, the output device 94 includes the display device 96. As such, the response may be configured to display location specific images on the display device 96. The display device may include screens or micro displays coupled to the frame 98 of the AR glasses. The screens or micro displays may be coupled to a left lens 104, a right lens 106, or both lenses of the AR glasses such that the location specific images are viewable for the guest wearing the AR glasses. In some embodiments, the left lens 104 and the right lens 106 are the screens or micro displays.

In some embodiments, the output device 94 is configured to output a plurality of responses based on the generated response instructions. For example, the output device 94 may be configured to cause the AR glasses to glow or illuminate in addition to displaying location specific images on the display device 96.

Figure 4:
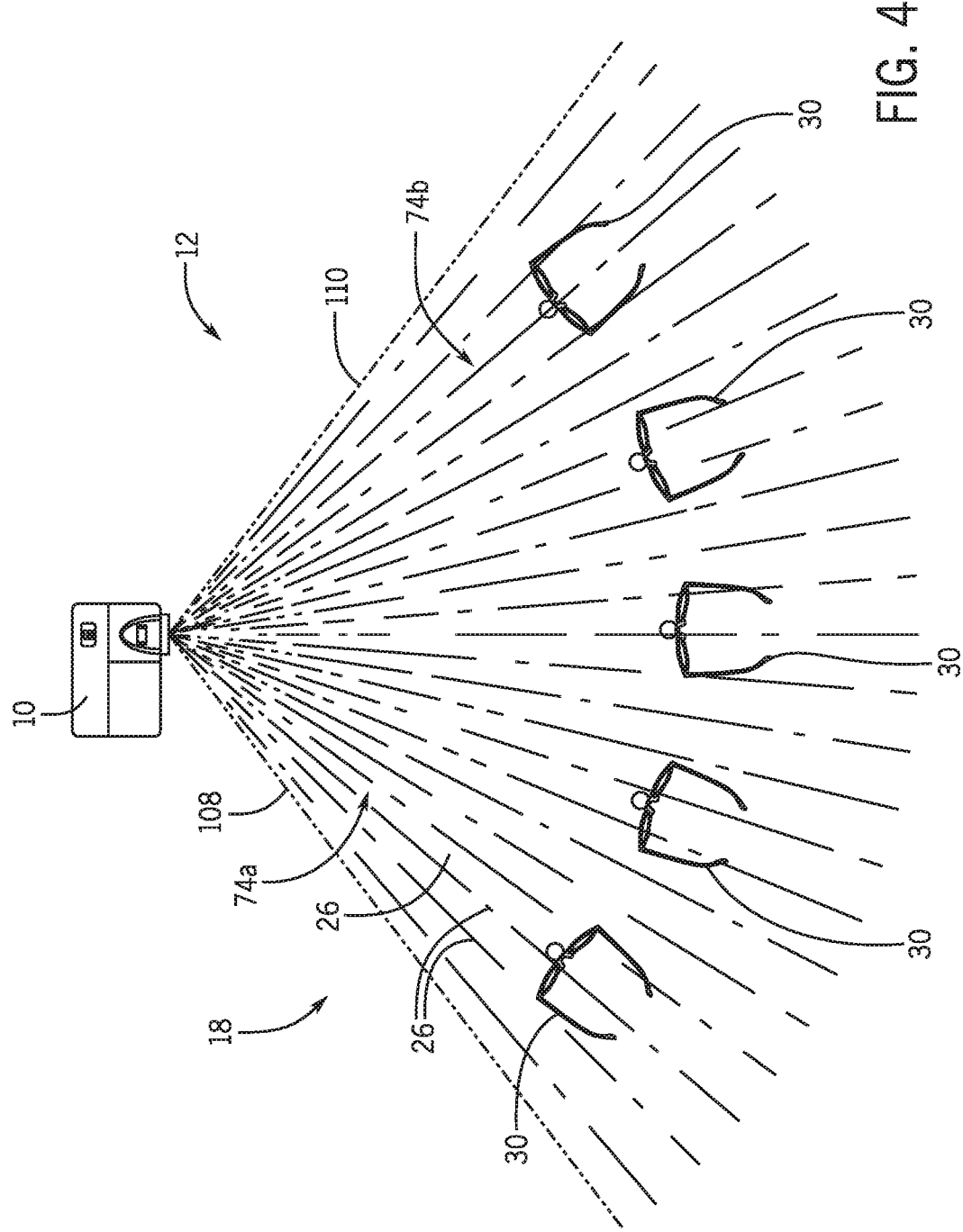
FIG. 4 is a top view of an embodiment of a projection device emitting a first group of light beams and a second group of light beams into an amusement park attraction, in accordance with an aspect of the present disclosure.

FIG. 4 is a top view of an embodiment of a projection device 10 emitting the first group of light beams 74a and the second group of light beams 74b into the amusement park attraction 12. In some embodiments, the individual light beams 26 of the plurality of light beams 14 are divided into a plurality of groups of light beams. Each individual light beam 26 of corresponding to a same group of light beams may share a unique modulation pattern. For example, the plurality of light beams 14 may include the first group of light beams 74a and the second group of light beams 74b. The first group of light beams 74a may include a first modulation pattern indicative of a first area 108 of the amusement park attraction 12 through which the respective unique paths of each individual light beam 26 of the first group of light beams 74a is configured to pass. That is, the first group of light beams 74a may include each of the individual light beams 26 emitted toward the first area 108 (e.g., a left portion) of the environment 18 of the amusement park attraction 12. The second group of light beams 74b may include a second modulation pattern indicative of a second area 110 of the amusement park attraction 12 through which the respective unique path of each individual light beam 26 of the second group of light beams 74b is configured to pass. That is, the second group of light beams may include each of the individual light beams emitted toward the second area 110 (e.g., a right portion) of the environment 18 of the amusement park attraction 12.

The receiver processor 82 of the receiver 30 may be configured to generate different response instructions for each of the groups of light beams. As such, the receiver processor 82 may generate a first set of response instructions based on a first modulation pattern corresponding to the first group of light beams 74a and a second set of response instructions based on the second modulation pattern corresponding to the second group of light beams 74b. Further, the receiver device 30 may output, via the output device, a first response (e.g., instruction for the guest to stay) in response to receiving the first set of response instructions when the receiver device is disposed within the first area 108 of the amusement park attraction 12. Moreover, the receiver device 30 may output, via the output device, a second response (e.g., instructions for the guest to move to the center of the environment) in response to receiving the second set of response instructions when the receiver device is disposed within the second area 110 of the amusement park attraction 12.

Figure 5:
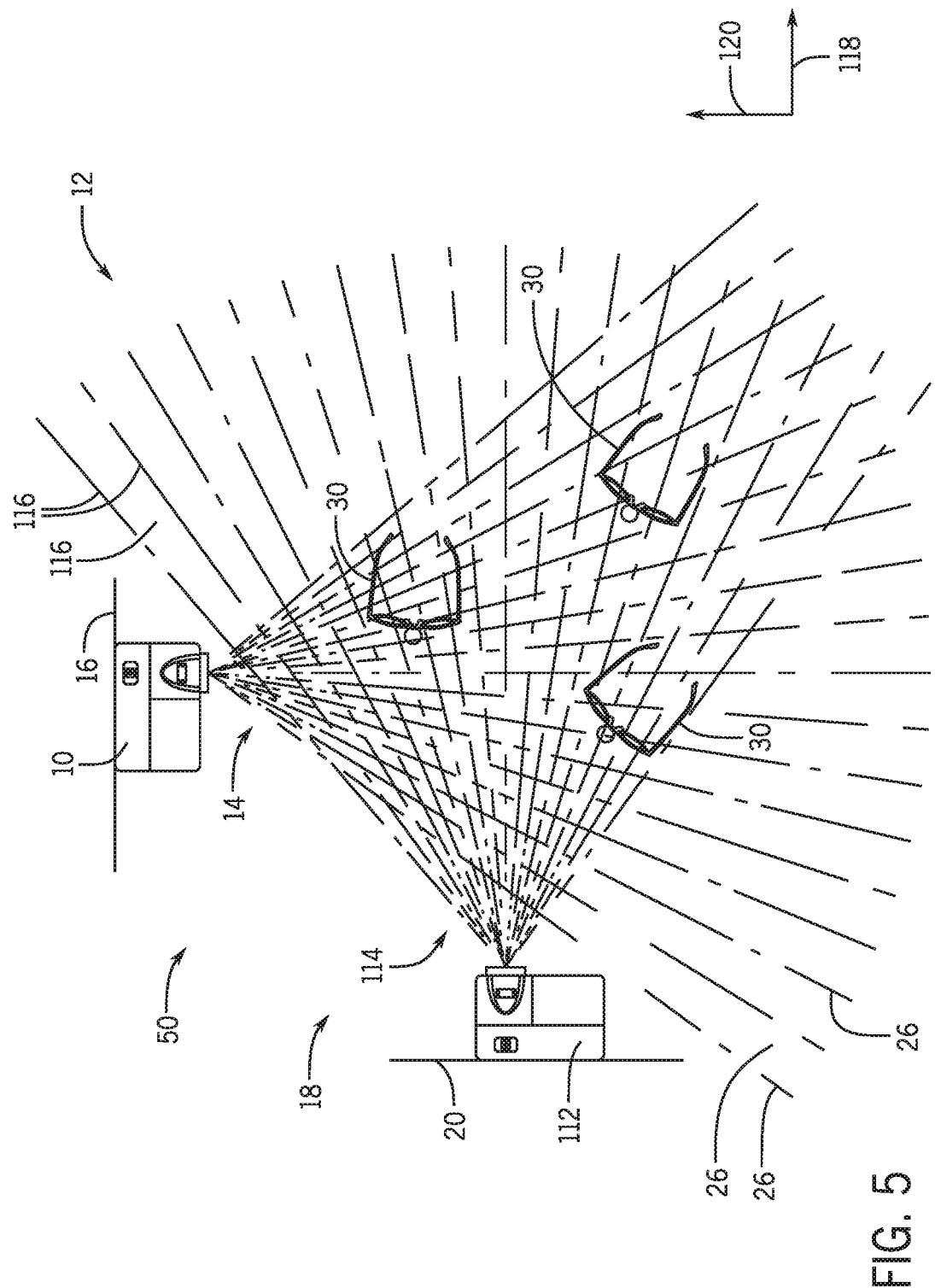
FIG. 5 is a top view of an embodiment the spatial data projection system having multiple projection devices, in accordance with an aspect of the present disclosure.

FIG. 5 is a top view of an embodiment of the spatial data projection system 50 having multiple projection devices 10. In some embodiments, the spatial data projection system 50 includes at least one additional projection device 112 configured to emit an additional plurality of light beams 114 into the amusement park attraction 12. The additional projection device 112 may be disposed such that additional individual light beams 116 of the additional plurality of light beams 114 are emitted in a direction that is angularly offset from the individual light beams 26 of the plurality of light beams 14. For example, the projection device 10 may be disposed on the front wall 16 of the environment 18 of the amusement park attraction 12, and the additional projection device 112 may be disposed on a left wall 20 of the environment 18 of the amusement park attraction 12.

The additional plurality of light beams 114 may include additional unique modulation patterns transmitted via the additional individual light beams 116. The receiver processor may determine a position of the receiver device with respect to at least two degrees (e.g., x-direction 118 and y-direction 120) by detecting both the individual light beams 26 and the additional individual light beams 116. The receiver processor may only determine a position of the receiver device 30 with respect to an x-direction 118 when only detecting the individual light beams 26. That is, using the data from the additional unique modulation pattern received via the additional individual light beam 116, in combination with the unique modulation pattern received from the detected individual light beam 26, the receiver processor may determine the position of the receiver device with respect to the x-direction 118 (e.g., lateral position) and the y-direction 120 (e.g., longitudinal position) in the environment 18 of the amusement park attraction.

The receiver processor 82 may only determine a position of the receiver device 30 with respect to the x-direction 118 when only detecting the individual light beams 26 because the individual light beams 26 follow respective unique paths that vary over the x-direction 118. Thus, the receiver device 30 may determine the lateral position of the receiver device 30 based on the detected individual light beam 26 and a corresponding x-direction position associated with the detected individual light beam 26. However, as the individual light beams 26 follow unique paths that are substantially aligned with the y-direction 120, the individual light beams 26 may not provide distinct y-direction data to the receiver device 30, and the position of the receiver device 30 with respect to the y-direction 120 may not be determined by detecting only the individual light beams 26.

However, the additional plurality of light beams 114 may be emitted substantially perpendicular to the plurality light beams 14. Thus, the additional individual light beams 116 of the additional plurality of light beams 114 may follow respective unique paths that vary along the y-direction 120. Thus, the receiver device 30 may determine the longitudinal position of the receiver device 30 based on the detected additional individual light beam 116 and a corresponding y-direction position associated with the detected additional individual light beam 116. Accordingly, the receiver device 30 may determine the lateral position of the receiver device 30 with respect to the x-direction based on the unique modulation pattern transmitted by the individual light beam 26, and the longitudinal position of the receiver device 30 with respect to the y-direction based on the additional unique modulation pattern transmitted via the additional individual light beam 116.

The sensor of the receiver device 30 may be configured to detect the plurality of light beams 14 and the additional plurality of light beams 114. To differentiate between the plurality of light beams 14 and the additional plurality of light beams 114, the projection device 10 and the additional projection device 112 may be configured to emit the respective light beams within different frequency ranges. For example, the projection device 10 may be configured to emit the plurality of light beams 14 at frequencies within a first range of frequencies (e.g., 300 GHz to 3000 GHz), and the additional projection device 112 may be configured to emit the additional plurality of light beams 114 at nonoverlapping frequencies within a second range of frequencies (e.g., 3000 GHz to 6000 GHz). The sensor may be configured to detect individual light beams in both the first range and second range of frequencies. In some embodiments, the receiver device 30 includes a first sensor configured to detect light beams within the first range of frequencies, and a second sensor configured to detect light beams within the second range of frequencies. The first sensor, the second sensor, or both may be configured to output, to the processor, position data corresponding to the detected individual light beam 26 of the plurality of light beams 14, the additional individual light beam 116 of the additional plurality of light beams 114, or both.

The processor of the receiver device 30 is configured to determine a position of the receiver device 30 and generate the response instructions based at least in part on the position data output from the first sensor, the second sensor, or both. The processor may determine the position (i.e., with respect to the x-direction, the y-direction, or both) of the receiver device 30 and generate the response instructions based at least in part on the unique modulation pattern corresponding to the detected individual light beam 26 within the first range of frequencies, the additional unique modulation pattern corresponding to the additional light beam 116 within the second range of frequencies, or both.

In some embodiments, the receiver device 30 may be configured to determine the lateral and longitudinal position of the receiver device 30 based on the unique modulation pattern from only the individual light beam 26. The unique modulation pattern may be configured to vary over time. The processor of the receiver device 30 may be configured to determine the longitudinal position of the receiver device 30 based at least in part on a time that the sensor of the receiver device 30 detects the individual light beam 26. The receiver memory may be configured to store time data associated with the unique modulation pattern. The time data may include a longitudinal position corresponding to a particular unique modulation pattern and a time the individual light beam is detected. Based on the time data and the detected individual light beam, the receiver processor may determine the lateral and longitudinal position of the receiver device 30.

Figure 6:
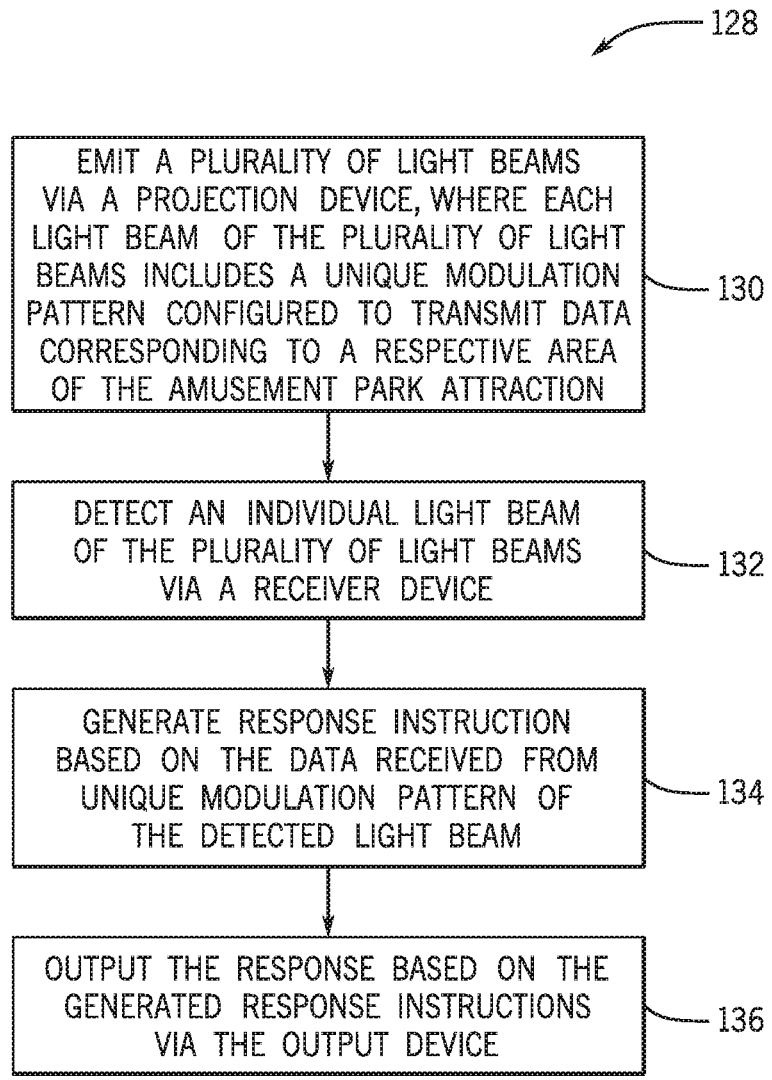
FIG. 6 is a flow chart of an embodiment of a method for operating the spatial data projection system, in accordance with an aspect of the present disclosure.

FIG. 6 is a flow chart 128 of an embodiment of a method for operating the spatial data projection system. The method includes the step of emitting a plurality of light beams via a projection device, where each light beam of the plurality of light beams includes a unique modulation pattern configured to transmit data corresponding to a respective area of the amusement park attraction (block 130). The data may correspond to the respective area of the amusement park attraction through which a respective light beam passes.

The method further includes the step of detecting an individual light beam of the plurality of light beams via a receiver device (block 132). The receiver device may include augmented reality display glasses (AR glasses), a wand, a drone, or some other suitable device configured to detect the individual light beam emitted from the projection device.

The method includes the step of generating a response instruction based on the data received from unique modulation pattern of the detected individual light beam (block 134). As set forth above, the data may correspond to a respective area of the amusement park attraction. In some embodiments, the data include positional data. Based on the positional data, a processor may determine a position or location of the receiver device in the amusement park attraction. Further, based on the position or location of the receiver device, the processor may generate response instructions configured to cause an output device to output a response. In another embodiment, the data includes instructions that may be relayed directly to the output device, via communications circuitry. The instructions may be configured to cause an output device to output a response.

The method further includes outputting the response based on the generated response instructions via the output device (block 136). In some embodiments, the output device includes glasses. Further, the response may include displaying an image on at least one lens of the glasses such that the image is viewable for a guest wearing the glasses. Moreover, the image may include a textual image, a picture image, a video image, or some combination thereof.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a projection device configured to emit a plurality of light beams, wherein each individual light beam is emitted with a unique path within an environment, and wherein each individual light beam comprises a modulation pattern configured to transmit position data corresponding to the unique path;
a receiver device, comprising:
a memory storing an identification of the receiver device;
a sensor configured to detect at least one individual light beam of the plurality of light beams;
a light source;
communications circuitry configured to wirelessly transmit sensor data along with the identification of the receiver device; and
a system controller configured to:
receive the sensor data and the identification of the receiver device;
determine a position of the receiver device within the environment based on the sensor data;
associate the identification of the receiver device to the determined position;
generate a location-specific special effect command comprising instructions to activate the light source of the receiver device based on the identification of the receiver device and the determined position; and
transmit the location-specific special effect command to the receiver device.

2. The system of claim 1, wherein the receiver device comprises an aerial drone, and wherein the aerial drone is configured to follow a flight path and activate the light source based on the generated location-specific special effect command.

3. The system of claim 1, wherein the plurality of light beams comprises a first group of light beams and a second group of light beams, wherein each light beam corresponding to the first group of light beams comprises a first modulation pattern indicative of a first area through which respective unique paths of each light beam of the first group of light beams are configured to pass, and wherein each light beam corresponding to the second group of light beams comprises a second modulation pattern indicative of a second area through which respective unique paths of each light beam of the second group of light beams are configured to pass.

4. The system of claim 3, wherein the system controller is configured to generate a first set of response instructions based on the first modulation pattern and a second set of response instructions based on the second modulation pattern, and wherein the receiver device is configured to output a first response based on the first set of response instructions when the receiver device is disposed within the first area and output a second response based on the second set of response instructions when the receiver device is disposed within the second area.

5. The system of claim 1, wherein the projection device comprises an infrared light source, and wherein the plurality of light beams comprise infrared light.

6. The system of claim 1, wherein the projection device comprises a digital micro-mirror assembly configured to actuate at least one micro-mirror to selectively reflect light from an additional light source to generate the modulation pattern of each individual light beam of the plurality of light beams.

7. The system of claim 1, wherein the memory of the receiver device comprises at least one set of decoding instructions for a receiver processor, wherein the at least one set of decoding instructions corresponds to detected light beams within a range of frequencies, wherein the at least one set of decoding instructions is configured to cause the receiver processor to decode the modulation pattern of the detected light beams within the range of frequencies.

8. The system of claim 1, comprising an additional projection device configured to emit an additional plurality of light beams, the additional plurality of light beams comprising additional modulation patterns, wherein the projection device is configured to emit the plurality of light beams at frequencies within a first range of frequencies, and wherein the additional projection device is configured to emit the additional plurality of light beams at frequencies within a second range of frequencies.

9. The system of claim 8, wherein a processor of the system controller is configured to determine a position of the receiver device and generate the location-specific special effect command based at least in part on the position of the receiver device, wherein the processor is configured to determine the position of the receiver device based at least in part on the modulation pattern of at least one detected light beam within the first range of frequencies and the additional modulation pattern of at least one additional detected light beam within the second range of frequencies.

10. The system of claim 8, wherein the additional projection device is configured to emit the additional plurality of light beams in a direction angularly offset from the direction of the plurality of light beams.

11. A system, comprising:
a system controller configured to generate a plurality of image data instruction sets, wherein each image data instruction set corresponds to a respective area;
a projection device configured to emit a plurality of light beams simultaneously, wherein an individual light beam of the plurality of light beams comprises a modulation pattern configured to transmit image data based on an image data instruction set corresponding to an area through which the individual light beam is configured to pass;
a receiver device, comprising:
  a memory storing an identification of the receiver device;
  a sensor configured to detect at least one individual light beam of the plurality of light beams;
  communications circuitry configured to wirelessly transmit sensor data along with the identification of the receiver device to the system controller;
  a processor configured to:
    determine the image data based on the transmitted image data of the modulation pattern of the detected individual light beam;
    determine location data of the receiver device based on the modulation pattern of the detected individual light beam; and
    generate display instructions to display an image based on the image data and the location data; and
  a display device configured to display the image according to the display instructions.

12. The system of claim 11, wherein the receiver device comprises glasses, wherein the glasses are configured to display the image on at least one lens of the glasses such that the image is viewable for a guest wearing the glasses.

13. The system of claim 11, wherein the image comprises a textual image, a picture image, a video image, or some combination thereof.

14. The system of claim 11, wherein the projection device comprises a digital micro-mirror assembly configured to actuate at least one micro-mirror to selectively reflect light from an additional light source to generate the modulation pattern in the individual light beam.

15. The system of claim 11, wherein the projection device is disposed vertically above the respective area.

16. A method, comprising:
emitting a plurality of light beams via a projection device, wherein each individual light beam of the plurality of light beams comprises a unique modulation pattern configured to transmit data corresponding to a respective area;
detecting an individual light beam of the plurality of light beams via a sensor of a receiver device, wherein the receiver device comprises a light source and a memory storing an identification of the receiver device;
transmitting sensor data and the identification of the receiver device via communications circuitry of the receiver device to a system controller;
receiving the sensor data and the identification of the receiver device at the system controller;
determining a position of the receiver device within an environment based on the sensor data;
associating the identification of the receiver device to the determined position;
generating a location-specific special effect command comprising instructions to activate the light source of the receiver device based on the identification of the receiver device and the determined position; and
transmitting the location-specific special effect command to the receiver device.

17. The method of claim 16, wherein the output receiver device comprises glasses, and wherein the location-specific special effect command comprises instructions to display an image on at least one lens of the glasses such that the image is viewable for a guest wearing the glasses, wherein the image comprises a textual image, a picture image, a video image, or some combination thereof.

18. The system of claim 1, wherein the light source is configured to be activated to emit light of a selected color based on the location-specific special effect command.

19. The system of claim 1, wherein the location-specific special effect command drives activation of the light source to emit light of a first color based on the position data being associated with a first position and to emit light of a second color based on the position data being associated with a second position.

* * * * *